Oct. 7, 1924.   1,511,132

C. F. MARSTON

SELECTIVE CONTROLLING MECHANISM

Filed June 7, 1923   2 Sheets-Sheet 1

WITNESSES

INVENTOR
CHARLES F. MARSTON
BY
ATTORNEYS

Oct. 7, 1924.
C. F. MARSTON
1,511,132
SELECTIVE CONTROLLING MECHANISM
Filed June 7, 1923
2 Sheets-Sheet 2
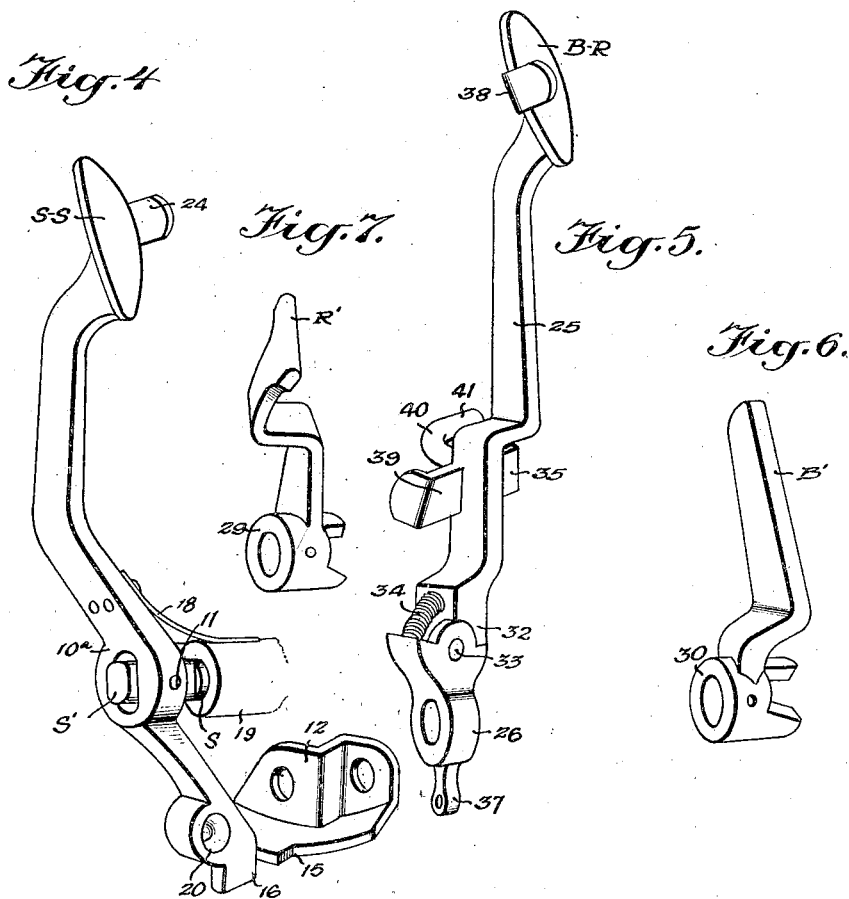

Patented Oct. 7, 1924.

1,511,132

UNITED STATES PATENT OFFICE.

CHARLES F. MARSTON, OF BROOKLYN, NEW YORK.

SELECTIVE CONTROLLING MECHANISM.

Application filed June 7, 1923. Serial No. 643,969.

*To all whom it may concern:*

Be it known that I, CHARLES F. MARSTON, a citizen of the United States, and a resident of the city of New York, borough of Brooklyn, in the county of Kings and State of New York, have invented a new and Improved Selective Controlling Mechanism, of which the following is a full, clear, and exact description.

This invention relates to selective control mechanisms such as are shown and described in U. S. Letters Patent to me No. 1,305,095, granted May 6, 1919, and No. 1,305,143, granted May 27, 1919.

Said Patent No. 1,305,095 disclosed, among other things, a single foot pedal in place of the clutch and reverse pedals commonly used in operating a Ford motor car, and mechanism responsive to bodily movement of said pedal and also swinging and sidewisely sliding movements thereof thereby to control the high, low and reverse speeds and to perform an automatic preliminary clutch disconnection in each case; but with the service brake pedal retained and operated as usual.

Said Patent No. 1,305,143 disclosed, among other things, a single foot pedal in place of all three pedals commonly used in operating a Ford car, and mechanism responsive to various movements of said single pedal for variously operating the standard Ford gearset and also to apply the service brake automatically when required, as following an actuation of said single pedal to set the transmission from low to neutral. According to the construction pursuant to this disclosure, the hand or emergency brake must be operated as usual.

One of the important objects of the present invention is also to provide a new and improved selective controlling mechanism, more especially designed for use on automobiles, auto trucks and similar power-driven vehicles of the Ford or like type, and arranged to enable the operator in charge readily to actuate the gear-shifting mechanism or the brake mechanism by the use of a less number of pedals than three. In this connection, I have found that the presence of two pedals offers as little if not less difficulty to the operator than merely the one-pedal characteristic of the construction according to said Letters Patent No. 1,305,095, especially if neither of such two pedals is operable by more than two dissimilar sets of forward and return movements; and that the presence of two pedals, if each is operable by two such dissimilar sets of movements, offers as little if not less difficulty to the operator than if one of such pedals is operable by only one set of forward and return movements and the other is operable by three dissimilar sets of forward and return movements, as is characteristic of the two pedals provided according to said Letters Patent No. 1,305,143.

Thus, one of the main objects of the present invention is to provide a new and improved selective controlling mechanism, but one wherein two instead of three pedals are provided, neither of which is operable by more than two dissimilar sets of forward and return movements.

Another object is to provide a two-pedal construction of the kind just indicated, wherein both pedals are normally dependably biased to the most usual of the two sets of dissimilar forward and return movements for which each is capacitated.

A further object is to provide a construction as above, wherein the pedal most often used is operable relative to a fixed cam, shoulder, detent or equivalent means, and is preferably resiliently biased relative to said means, whereby, on the occurrence of most emergencies arising while the car is in movement and due to sudden changes in traffic-stream conditions, the pedal now being discussed, which is the forward-speeds-and-clutch pedal, hereinafter called the clutch pedal, will naturally and automatically be operated in the proper and intended manner and without special attention from the operator as to other possible modes of operation thereof; it being especially in mind to direct the claims of the Letters Patent to result from the instant application to the particular inventive concept last described, and refinements or variations thereof as pointed out hereinafter,—while at the same time providing an illustrative embodiment thereof constituting a construction wherein also the other pedal is associated with mechanism having exclusive dominion over the car so far as throwing the reverse drive in and out and controlling the service brake are concerned.

Still a further object of the invention, and a most important one, is to provide a construction as described in the last paragraph, and one wherein neither of the two pedals provided is dependent for proper operation on a preliminary or concomitant moving of the familiar hand-lever for the emergency brake to an intermediate position. Otherwise stated, an important object of the present invention is to retain such hand-lever, but merely for operation as a controller for the emergency brake and not as an ancillary control for the means for changing forward speeds.

Still referring to the object last-mentioned, the invention particularly aims to provide a selective controlling mechanism, especially adapted for Ford motor cars, wherein well-appreciated dangers and difficulties of operation are all overcome,—these dangers and difficulties being preferably thus overcome, as will be clear hereinafter, due to the complete elimination of the familiar cam-and-cam-follower connection between the ordinary Ford "speed lever" (fixed on the same "controller shaft" which fixedly mounts the emergency brake hand-lever, and carrying an arcuate cam) and the ordinary Ford "clutch-lever" (operated by the standard Ford clutch pedal). Instead of such a cam-and-cam-follower connection, wherein necessarily both cam and follower are independently movable and hence difficulty if not danger is experienced in finding and holding "neutral", by way of an actuation of the emergency brake hand-lever in timed relation to the operation of the standard clutch pedal, I eliminate entirely the necessity for any such relative-position operating relation between hand-lever and any pedal; that is to say, I entirely eliminate the standard arcuate cam aforesaid and its "speed-lever" mount. I provide, in lieu of the parts eliminated as just explained, a cam, shoulder or detent means as above-mentioned, that is, one not operatively connected at all to the controller shaft, preferably by being fixed as aforesaid relative to all other moving parts; and I further associate, with said means and with my new clutch pedal, a means, preferably a spring, which may always be depended on automatically to snap said pedal (preferably sidewisely) into engagement with a notch or the like forming the main characteristic of such detent means. Such notch is located precisely at the position required for securely yet readily releasably detaining the last-mentioned pedal at neutral, on the total release of foot-pressure on the pedal just previously holding the latter all the way down and forward, or "in low"; and the permanent fixation of such neutral notch or equivalent at this point, represents the attainment of an important object of the present invention, as it is well-known that the neutral point not only changes from time to time in a given Ford car, due to gradually increasing wear of the cam or its follower or both, but is at different locations in different cars when new. The hereinbefore referred to dangers and difficulties of operation of a Ford car as delivered from the factory, and the overcoming of all of which dangers and difficulties, arising from the inability of the average operator always to rely on his skill in properly setting the usual emergency brake hand-lever at neutral, is an important object of the present invention, may be here listed, to wit, the likelihood or certainty that the engine will stall (a) when the service brake is applied, (b) when the reverse drive is brought into play, (c) in attempting to go from low into neutral, and (d) in attempting to hold the transmission at neutral on complete release of pressure on the clutch pedal, arising in each case, as aforesaid, unless the emergency brake hand-lever is accurately set at the properly "felt" intermediate position as a preliminary to each of the just-indicated pedal actuations.

A further object is to provide a selective controlling mechanism as hereinabove indicated, and one wherein a single pedal for high and low speeds and also for clutch control is operated exactly as heretofore, and yet may be sidewisely moved a trifle when already in neutral as a natural initial actuation in moving the pedal to low; which pedal, however, may nevertheless be operated exactly as heretofore and without such a sidewise movement in going directly from low into high. A related object is, preferably, to provide such a pedal, and one so constructed that it is carried on the upper end of an arm which may conveniently be mounted for swinging about the axis of the speed-setting shaft of a Ford gearset in moving to high, low or neutral from any other setting.

A further object is to provide a selective controlling mechanism as last described, and one wherein the single pedal for service-braking and reversing, is selectively operable, by a side thrust to the right or to the left, as it is pushed forward, thereby to engage one or the other of two pick-up arms one of which is operatively connected to the reverse shaft and the other to the service-brake shaft of the Ford gearset. And a related object is, preferably, to provide such a pedal, and one so constructed that it is carried on the upper end of an arm which may conveniently be mounted for swinging about the axis of one of the two shafts last-mentioned, as the service-brake shaft.

Another object is to provide an exceedingly simple, rugged and reliable construction throughout, and including a small plurality of parts which may be applied expeditiously and easily to standard portions of Ford cars as now constructed, to incorporate therein a selective control mechanism according to the present invention in lieu of that ordinarily provided.

With these and other objects in view, the invention consists in certain novel features of constructions, relations of parts and principles of operation, all as will be hereinafter more particularly pointed out, in connection with the detailed description of the practical, but merely illustrative, embodiment of the invention shown in the accompanying drawings.

In these drawings, in which similar reference characters refer to similar parts throughout the several views:

Fig. 4 is a fragmentary perspective view showing on an enlarged scale one of the two pedals provided by the present invention, to wit, the pedal on the speed-setting shaft, and the fixed detent structure in the path of swing of the lower part of the pedal arm;

Fig. 5 is a view similar to Fig. 4, but showing the other pedal provided by the present invention, to wit, the pedal for being thrust forward and yet selectively to engage a device for rocking the usual reverse shaft or another device for rocking the usual service-brake shaft of the gearset;

Fig. 6 is a view similar to Fig. 5, but showing the former device, that is, the reverse pick-up arm; and Fig. 7 is a view similar to Fig. 5, but showing the latter device, that is, the service-brake pick-up arm.

Of the parts of the standard Ford gearset shown, the reference letter A indicates the casing therefor, the letter R indicates the reverse shaft, the letter S indicates the speed-setting shaft, hereinafter referred to as the speed-shaft, the letter B indicates the brake-pedal shaft, hereinafter called the brake-shaft, the letter C indicates the clutch-lever shaft, hereinafter referred to as the clutch-shaft.

The usual floor-board is indicated at F. The controller shaft and the hand-lever fixed thereon are not shown, as, pursuant to the present invention, such lever is used solely for emergency brake application and release.

Of the two pedals provided by the present invention, the one to the left marked S—S is the clutch (speed-setting) pedal, and the one to the right marked B—R is the service-brake as well as reverse drive control pedal.

Figure 1:
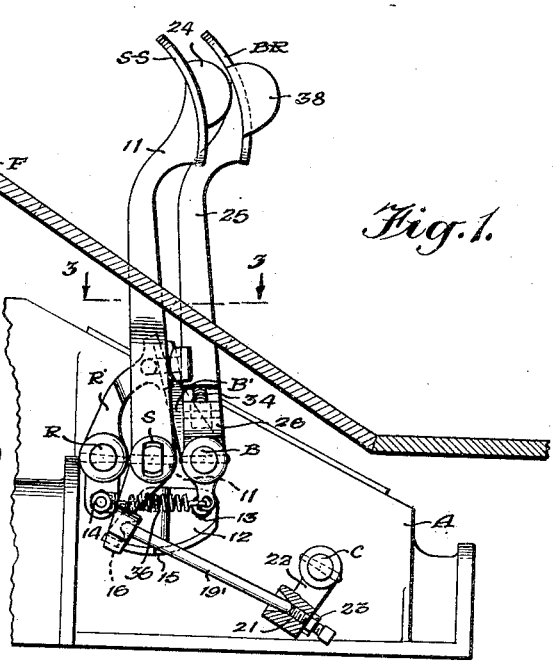
Fig. 1 is a side elevation of the selective controlling mechanism arranged for actuating the gearset of a Ford automobile, the casing for which gearset is also shown in side elevation,—parts of the new mechanism, as well as the usual Ford floor-board, being shown in section.
Figure 3:
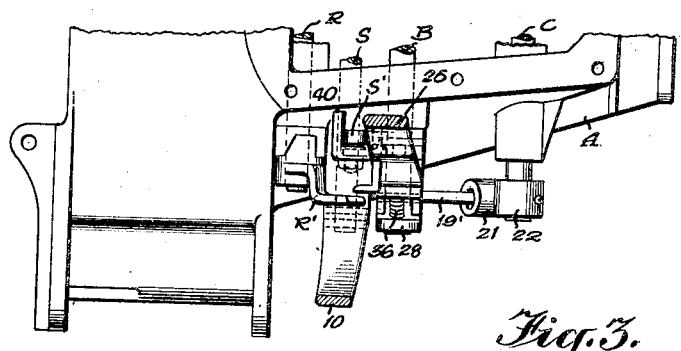
Fig. 3 is a horizontal section, taken substantially on the line 3—3 of Fig. 2, with the floor-board removed.

Referring first to the former pedal and its appurtenances, all readily attachable to a standard Ford gearset as will be understood in a moment, it will be seen most clearly from Fig. 1 that said pedal is fixed at the upper end of a pedal arm 10 secured on the speed-shaft S, so that when the pedal is thrust forward said shaft is rocked to set the transmission in low as usual, and so that when the pedal is restored to its normal position illustrated the transmission is thrown into high as usual.

Said appurtenances for the pedal S—S comprise (a) means for not only mounting the pedal arm 10 on shaft S as just described, but for permitting slight lateral rocking of the pedal and pedal arm, said means including a pin 11 and a ring structure 10$^a$ on the pedal arm and loosely embracing a reduced terminal structure S' on shaft S shaped as shown in Fig. 4; (b) a fixed cam, shoulder, detent or equivalent means, as a bracket or plate-fixture 12 secured by bolts marked 13 and 14 in Fig. 1 to the outside of casing A, this fixture having a shaped offset flange at its lower edge providing a notch, shoulder or stop 15 which is located, in attaching the fixture, exactly at a point such that whenever the pedal S—S has been swung to rock shaft S to set the gearset at neutral, an inturned claw or finger 16 on the bottom of lower extension 17 of pedal arm 10 may engage with said notch on a slight rocking of the pedal arm about the axis of pin 12; (c) a leaf-spring 18 anchored at one end to pedal arm 10 and acting at its other end on a collar 19 on shaft S, as shown best in Fig. 4, such spring always tending to urge the pedal S—S in an anti-clockwise direction as viewed in Fig. 2, thereby to cause finger 16 to be caught by neutral-stop 15 following full release of the foot-pressure on the pedal previously holding it in low, all to the end that said pedal is always prevented from inadvertently passing neutral or inadvertently going directly from low to high; (d) a rod-link 19' loosely socketed at one end in a cup-structure 20 at the bottom of pedal arm extension 17 and loosely socketed at its other end in a cup-structure 21 forming a part of a short-arm 22 fixed on clutch shaft C, the latter cup-structure having set therein a screw and lock-nut means as indicated at 23 in Fig. 1 for convenient lostmotion adjustments if and as required, it being understood that as usual the clutch coil-spring (of course inside the casing A, and not shown) always tends to rotate clutch-shaft C as viewed in Fig. 1 in a clockwise direction; and (e) an upstanding web 24 at the right side of the pedal, so that in the single case where it is not desired to hold the transmission at neutral after leaving low, a slight thrusting to the right of the operator's left foot on the pedal, accompanied by a lifting of such foot, permits the pedal to be moved by the clutch coil-spring directly from low into high just as though the fixture 12 were not present at all.

The operation of the attachment comprising the S—S pedal and its associated parts as just described should be entirely clear from the foregoing. But it should be particularly noted that in applying foot-pressure to said pedal to go from neutral into low, the operator need pay no attention at all to the side web 24 of the pedal, and also that the only possible way for him to go directly from neutral into high, thus to stall the engine, is by a deliberate side thrust to the right as he applies foot-pressure to send the pedal all the way forward. Particular note should also be made that, after the pedal arm 10 is once caught by the fixture 12 at neutral in coming from either high or low, as in stopping, said pedal arm is always securely detained as so caught, and hence the operator may depend on it that the car will remain stopped and yet the engine may continue running, whether or not he stays in the car or leaves it,—so long as his left foot is not thrust forcibly against the pedal, either forwardly or to the right, or, better still, so long, as such foot is removed from the pedal.

It will thus be understood that an important feature of the invention is what may be termed a gyratable mounting of either the pedal-carried finger 16, or the notch, shoulder or stop 15, both of which elements 15 and 16 may be considered as relatively movable projections so arranged that when such relative movement occurs in a path lying in one plane, the projections co-act and lock against each other, and when such relative movement occurs in a path in a plane at a considerable angle to the first mentioned plane, the projections may be freed from interlocking engagement and, indeed, the movable one may be given its full back and forth swing toward and past the other projection without engaging the latter at all. In the present case, the one of the two projections 15 and 16, which is thus gyratably mounted is the finger 16 carried integrally by the pedal S—S; and this for the purpose not only of permitting said projection to be thus carried by the pedal but to facilitate low cost of construction and convenience of operation by permitting one gyratable mounting to serve for both the pedal and the movable projection. By saying that the pedal or projection 15 or 16 is gyratably mounted, is meant that there is provided a mounting such that said projection or any part of the pedal appreciably removed from the confines of said mounting is movable through a path which cannot be contained in a single claim.

Figure 2:
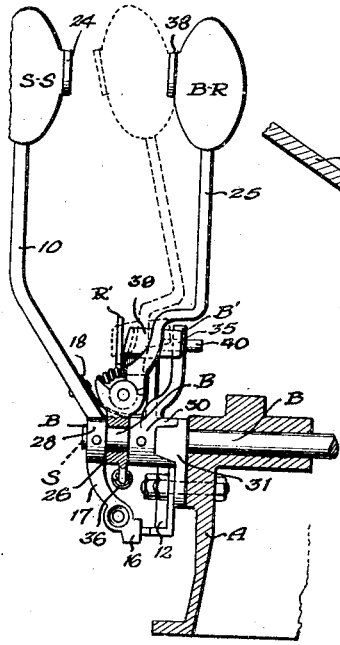
Fig. 2 is a transverse vertical section through one side of said gearset casing, showing partially in elevation and partially in section the usual service-brake shaft and associated devices and also certain of the devices associated with the speed-setting shaft located just beyond said service-brake shaft.

Now referring to the other pedal, and its appurtenances, the pedal B—R is adapted selectively to co-act with one or the other of a pair of pick-up arms, one of which arms is marked R' and is for setting the transmission in reverse and the other of which arms is marked B' and is for applying the service-brake. These elements also are readily attachable to the standard Ford gearset as will be understood in a moment. Fig. 1 shows best how the two shafts R and B are utilized for applying the pick-up arms R' and B', on which shafts said arms are made fast, as by the pins there indicated, and also the fact that pedal B—R is operatively connected with shaft B by way of a pedal arm 25. Pedal arm 25, however, is freely swingable about the axis of shaft B, in other words, carries a hub-portion, as shown best at 26 in Figs. 2 and 5, which is loose on shaft B. As shown in Fig. 2, said hub-portion 26 is located between the hub-portion of arm B' and a collar 28 pinned on the outer end of shaft B. Arms R' and B' are both normally held in the positions shown in Fig. 1, due to the fact that such arms are provided with hub-portions shaped exactly like the similar portions of the usual Ford reverse and brake pedals, as shown best at 29 and 30 in Figs. 7 and 6. These hub-portions of course co-act with the usual reverse and brake pedal supports on shafts R and B, which supports are retained, as indicated in the case of the brake pedal support in Fig. 2 at 31. Thus the pick-up arms of Figs. 6 and 7 are really the ordinary Ford reverse and brake pedals, but with the pedals proper removed and with the pedal arms shortened and given special shapes. Such shapes are most convenient when the B—R pedal of the present invention is shaped and operatively connected to hub-structure 26 as shown in Fig. 5. Such connection comprises a double-stop-limited hinge 32 the pintle 33 of which is disposed at right angles to the shaft B. In order normally to hold the parts 26 and 25 relatively disposed as shown in Fig. 5 and in full lines in Fig. 2, an expansile coil spring is incorporated as shown at 34. Thus on applying straight-thrust foot-pressure to the pedal, the same is moved forward so that its right-hand lug 35 picks up arm B' which swings the same forward, thus rocking shaft B and applying the service-brake. When such foot-pressure is relieved, arm B' returns automatically to service-brake-releasing position, bearing against lug 35, and assists in turning pedal B—R to the position shown in Fig. 1; such pedal being also always urged toward the position last-mentioned as the result of the provision of a retractile coil spring marked 36 in Fig. 1 and connected at one end to an eye-lug 37 below hub-structure 26 and connected at its other end to the bolt marked 14 in Fig. 1.

In order that whenever desired the pedal B—R may conveniently be thrown to the broken line position of Fig. 2, against the tension of spring 34, and while held in that position thrust all the way forward, to set the transmission in reverse, such pedal is provided with an upstanding web 38 at its left side, and the pedal arm 25 carries to the left of lug 35, a lug 39. The two lugs are so shaped, relative to the shapings and positions of arms R' and B' that when foot-pressure is applied to the pedal and the right foot of the operator is further thrust to the left against web 38, pedal arm 25 assumes such a position, as that indicated in broken lines in Fig. 2, that lug 35 will clear arm B', while lug 39 will engage arm R'. Thus, on a forward thrust of pedal B—R as last described, only shaft R will be rocked, and the transmission will be set to reverse and with absolute assurance that the service-brake will not accidentally be applied possibly to stall the engine.

It is pointed out finally that pedal arm 25 carries a hook member 40 the straight terminal length of which marked 41 in Fig. 5 lies parallel with and forward of lug 35, so as to insure that when the pedal B—R is released to permit a return thereof to the full line position of Fig. 1, after a forward thrust either for service-break application or to set the transmission in reverse, said length 41 will engage with arm B', as the latter occupies or reaches service-brake-releasing position, thereby to prevent the spring 36 of Fig. 1 from acting further on hub-structure 28 and the parts carried thereabove.

Thus it will be seen that a practical embodiment of the invention has been disclosed, and one well calculated to attain all the various objects and having the various advantages hereinabove stated when applied, among other possible applications, to a Ford gearset; and it will be understood that wide variations of structure may be resorted to within the scope of the following claim.

I claim:

In a selective controlling mechanism for a variable speed gearset, the combination with means operable at will for readjusting the set from high to low and vice versa, of means automatically operable to catch and hold said speed-shaft at neutral upon an operation of the means first-mentioned to readjust the set from low to high, the second-mentioned means including a detent device for the first-mentioned means, said first-mentioned means including a lever fulcrumed on a horizontal axis and having an arm below such axis, such arm having a structure predeterminedly automatically coacting with said detent device.

CHARLES F. MARSTON.